United States Patent
Fan

[19]

[11] Patent Number: 5,979,016
[45] Date of Patent: Nov. 9, 1999

[54] COVER HINGE STRUCTURE

[75] Inventor: Chung-Chou Fan, Miao Lee, Taiwan

[73] Assignee: Mustek Systems Inc., Taiwan

[21] Appl. No.: 09/133,491

[22] Filed: Aug. 12, 1998

[51] Int. Cl.$^6$ .................................................. E05D 7/10
[52] U.S. Cl. .................................. 16/267; 16/266; 16/386
[58] Field of Search .............................. 16/267, 266, 269, 16/260, 386

[56] References Cited

U.S. PATENT DOCUMENTS

| | | | |
|---|---|---|---|
| 2,732,581 | 1/1956 | Heck | 16/267 |
| 3,295,714 | 1/1967 | Addario | 16/267 |
| 4,598,889 | 7/1986 | Remington | 16/267 |
| 4,684,017 | 8/1987 | Watanabe et al. | 16/267 |
| 5,815,886 | 10/1998 | Nishio et al. | 16/360 |

*Primary Examiner*—Chuck Y. Mah
*Attorney, Agent, or Firm*—Bacon & Thomas

[57] ABSTRACT

A cover hinge structure having self-protection function, which consists of a cylindrical hinge pin and a hook. The hinge pin and the hook are integrated with a body and a cover, respectively. An engaging groove with an opening narrower than the hinge pin forms at the engaging end of the hook. When the cover is lifted to the limit, the action force acted by the pin on the hook from directs toward the opening of the engaging groove and the direction of the action force is the same as the opening direction of the engaging groove. Thus, the pin detaches from the hook automatically before damage to the hinge structure occurs if great force is applied.

2 Claims, 9 Drawing Sheets

COVER HINGE STRUCTURE

BACKGROUND OF THE INVENTION

1. Field of the Invention

The invention relates to a hinge structure and, more particularly, to a cover hinge structure having self-protection function.

2. Description of the Related Art

As shown in FIG. 5, a conventional hinge 51, which is made of metal or plastic materials, connects a cover 52 with a body 53 by fixing the two leaves of hinge 51 onto the cover and body with screws 54. This prior hinge structure is quite durable; however, additional fixing members (not shown) for supporting the screws 54 are necessary when assembling the hinge 51, cover 52, and body 53. In addition, the hinge 51 is made separately from the cover 52 and body 53, thereby increasing the fabricating cost and complicating the assembling procedure. Besides, the screws and the additional fixing members also increase the size of a device.

Therefore, a simple hinge structure 60 shown in FIG. 6 is widely used for taking the place of the prior hinge 51. A hinge structure 60 includes a cylindrical hinge pin 61 integrated with a body 65 and a hook 62 integrated with a cover 64 (see FIG. 7A). The pin 61 is introduced into a hole 63 located at one end of the hook 62, thereby the hook 62 rotates around the pin 61 freely. When the cover 64 is lifted, the hook 62 rotates about the pin 61, thereby the cover 64 moves around the body 65. FIG. 7B shows a transformation of the hinge structure 60 shown in FIG. 7A, wherein a pin 61 is fixed on a hook 62 and a hole 63 is located at the body 65.

When assembling the hinge structure 60, the hook 62 is pulled outward slightly to let the pin 61 slip into the hole 63. After the hook 62 is released, the pin 61 is restricted within the hole 63 with the resilience of the hook 62. The hinge structure 60 is advanced in that it can be easily made with low cost and be quickly assembled. However, if the cover 64 is lifted up with great force or is continuously rotated after the pivotal motion of the cover 64 is restricted by the body 65, the pin 61 breaks at its base end. Besides, the pin 61 tends to escape from hole 63 easily.

Therefore, hinge pins with two base ends are provided to make the hinge structure more durable. Referring to FIG. 8A, a prior hinge structure 80 includes a pin 81 and a hook 82. The cylindrical hinge pin 81 connects to a body 85 at its both ends, while the hook 82 connects to the cover 84 at its base end. An engaging groove 83 forms at another end of the hook 82. As seen in FIG. 8A, an opening 86 for assembling of hinge structure 80 forms under the engaging groove 83. The width of the opening 86 is slightly larger then the diameter of the pin 81, thereby the pin 81 enters the engaging groove 83 easily by way of the opening 86 when assembling the pin 81 with the hook 82. Because of the weight of the cover 84, the hook 82 is forced downward during rotating of the cover 84, and the contact region for the pin 81 and the hook 82 is restricted between points P, Q, and R. Accordingly, undesired detachment of the pin 81 from the engaging groove 83 is prevented.

Referring to FIG. 8B, when the body 85 stops pivotal motion of the cover 84, that is, the cover 84 is lifted to the limit, since rotating direction a of the cover 84 differs from the opening direction of the opening 86 of the engaging groove 83, while the contact point A of the pin 81 and hook 82 is away from the opening 86, the pin 81 will not escape from the engaging groove 83. In addition, the conformation of the hook 82 is specially designed so that the pin 81 and the hook 82 can be detached only when they are adjusted to a particular angular range. Besides, the width of the opening 86 can be slightly smaller than the diameter of the pin 81 to avoid detachment of the pin 81 and the hook 82.

Another prior hinge structure 90 consists of a pin 91 and a hook 92, as seen in FIG. 9A. The base end of the hook 92 connects to a cover 94 and the engaging end of the hook 92 includes an extruding front jaw 98 and an extruding rear jaw 99. The front jaw 98 and rear jaw 99 are of the same length, while the opposite surfaces of both jaws are curved to jointly form a substantially C-shaped engaging groove 93 having an internal diameter substantially the same as the diameter of the pin 91. Distance between the extruding ends of the front jaw 98 and the rear jaw 99 is smaller than the diameter of the pin 91, thereby forming an opening 96 narrower than the pin 91. The hook 92 further includes an resilient slit 97 extending from the engaging groove 93 toward the base end of the hook 92. When assembling the pin 91 with the hook 92, the opening 96 is directed toward the pin 91 and the hook 92 is pressed against the pin 91. The pin 91 applies reaction forces onto the extruding ends of the front jaw 98 and the rear jaw 99, thereby pressing the front jaw 98 and the rear jaw 99 outwardly. Part of the hook 92 around the resilient slit 97 deforms outwardly, too, and the width of the opening 96 increases gradually. As the width of the opening 96 equals to the diameter of the pin 91 when the reaction forces coming from the pin 91 reaches a certain value (that is, the action force from the hook 92 to the pin 91 reaches a certain value), the pin 91 slips into the engaging groove 93. The pin 91 is held by the front jaw 98 and the rear jaw 99 since the internal diameter of the engaging groove 93 is substantially the same as the diameter of the pin 91. Because the width of the opening 96 is narrower then the diameter of the pin 91 and the hook 92 is elastic, the pin 91 stays within the engaging groove 93 during pivotal motion of the cover 94. Besides, as described above, the hook 92 is forced downward during rotating of the cover 94 because of the weight of the cover 94, and the contact region for the pin 91 and the hook 92 is restricted at the upper portion of the inner surface of the engaging groove 93. Accordingly, undesired detachment of the cover 94 from the body 95 is prevented.

However, the aforementioned hinge structures 80 and 90 may easily break down when the body stops the pivotal motion of the cover, that is, the cover is lifted to the limit. Referring now to FIG. 8B, if the cover 84 is forced to rotate after the cover 84 contacts a point B of the body 85, the rotating direction of the cover 84 points to direction a, the reaction force applied from the pin 81 to the hook 82 points to direction c and acts on a point A away from the opening 86. Thus, the hook 82 deforms. At this moment, if the applied force is large enough to make the deformation of the hook 82 exceed its elastic limit, the hook 82 is damaged or even breaks down.

On the other hand, if the hook 82 contacts point B of the body 85 after the cover 84 is lifted to the limit, as shown in FIG. 8C, the rotating direction of the cover 84 points to direction a, the reaction force applied from the pin 81 to the hook 82 points to direction e, and the opening direction of the opening 86 points to direction b. The direction b and direction e are substantially parallel; nevertheless, the reaction force applied from the pin 81 to the hook 82 acts on point C that is away from the opening 86. Therefore, undesired detachment of the pin 81 and the hook 82 is prevented. However, for the conventional plastic materials used for making the case of a device (e.g., ABS or the like), the pin 81 does not escape from the groove 83 if deformation of the hook 82 is under its elastic limit even though the reaction forces from the pin 81 deforms the hook 82 (FIG. 8D). Similarly, if the applied force is large enough to make the deformation of the hook 82 exceed its elastic limit, the hook 82 is damaged or even breaks down.

For the hinge structure 90, the hook 92 contacts a point B of the body 95 when the cover 94 is lifted to the limit, as seen in FIG. 9B. The rotating direction of the cover 94 points to direction a, the reaction force applied from the pin 91 to the hook 92 points to direction e and acts on point C of the front jaw 98. Thus, the hook 92 deforms. If the applied force is large enough to make the deformation of the hook 92 exceed its elastic limit, the hook 92 is damaged or even breaks down. In order to make the hinge structure 90 more durable, the front jaw 98 is thickened to increase its tolerance to the reaction force. However, damage or breaking down of the hinge structure remains unavoidable.

SUMMARY OF THE INVENTION

Therefore, the member of the invention is to provide a cover hinge structure having self-protection function, which can be easily made with low cost and can be easily assembled.

A cover hinge structure according to the invention consists of a cylindrical hinge pin and a hook. The hinge pin is integrated with a body wherein both ends of the pin connect to the body, while the hook is integrated with a cover at its base end. Thus the cover hinge structure according to the invention can be easily made with low cost. An engaging end of the hook includes an extruding front jaw and a rear jaw. The opposite surfaces of the front jaw and rear jaw are curved to jointly form a substantially C-shaped engaging groove having an internal diameter substantially the same as the diameter of the hinge pin. Distance between the extruding ends of the front jaw and the rear jaw is smaller than the diameter of the hinge pin, thereby forming an opening narrower than the hinge pin. The hook further includes an resilient slit extending from the middle of the bases of the front jaw and the rear jaw toward the base end of the hook. The size of the cover hinge structure according to the invention is small because of its simple construction.

The hinge structure according to the invention is characterized in that the reaction force acted by the pin on the hook directs toward the opening of the engaging groove and the direction of the reaction force is the same as the opening direction of the engaging groove of the hook when the cover is lifted to the limit. The hinge pin applies reaction forces onto the extruding ends of the front jaw and the rear jaw, thereby pressing the front jaw and the rear jaw outwardly. Part of the hook around the resilient slit deforms outwardly, too, and the width of the opening increases gradually. As the width of the opening equals to the diameter of the hinge pin when the reaction forces from the hinge pin reaches a certain value, the hinge pin slips out from the engaging groove. Therefore, the pin detaches from the hook automatically before damage to the hinge structure occurs when great force is applied.

DESCRIPTION OF THE PREFERRED EMBODIMENTS

Figure 1A:
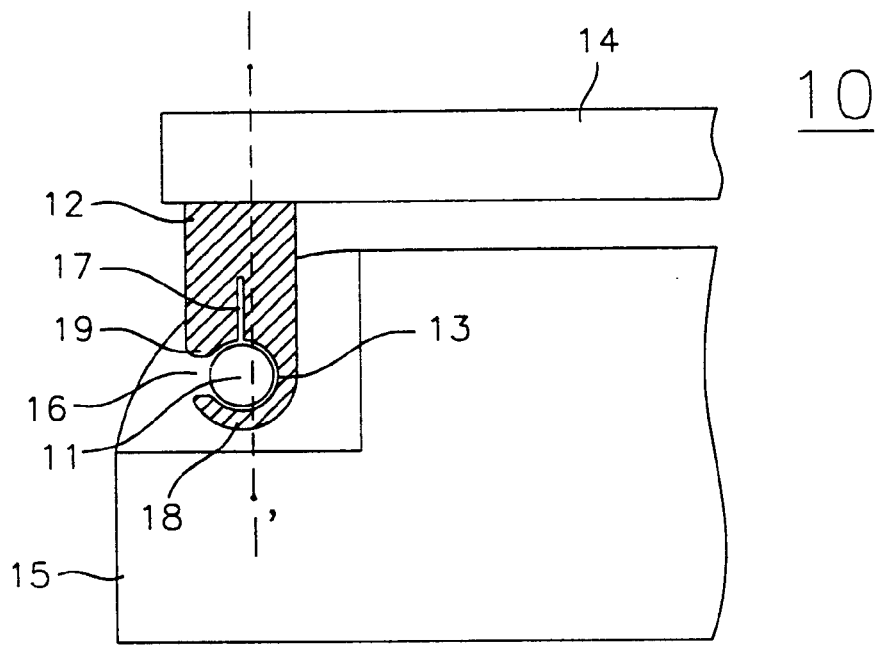
FIG. 1A is a schematic diagram showing a cover hinge structure according to the first embodiment of the invention.
Figure 1B:
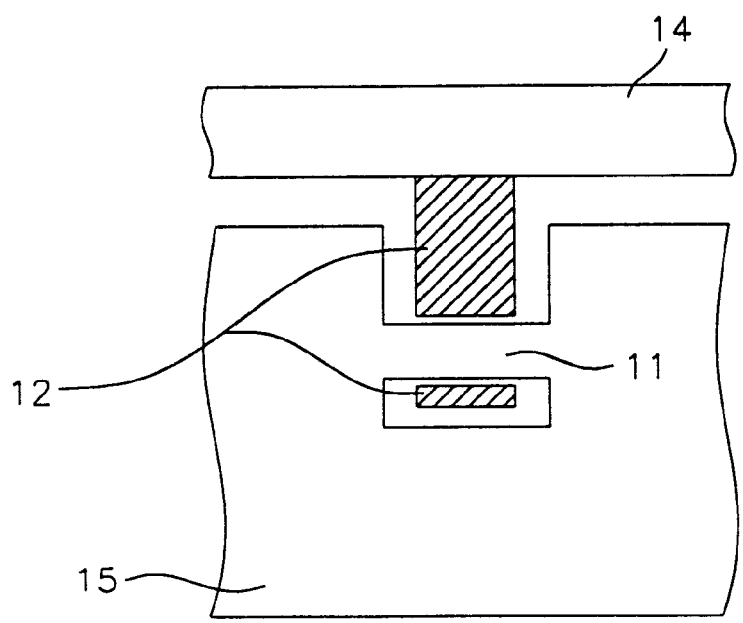
FIG. 1B is a cross sectional view of the first embodiment of the invention taken along the line I-I' shown in FIG. 1A.

Referring to FIGS. 1A and 1B, a hinge structure 10 according to a first embodiment of the invention includes a pin 11 and a hook 12. The pin 11 is integrated with a body 15 and the hook 12 is integrated with a cover 14. The base end of the hook 12 connects to the cover 14 and the engaging end of the hook 12 includes an extruding front jaw 18 and a rear jaw 19. The opposed surfaces of both jaws are curved to form a substantially C-shaped engaging groove 13 having an internal diameter substantially the same as the diameter of the pin 11. Distance between the extruding ends of the front jaw 18 and the rear jaw 19 is smaller than the diameter of the pin 11, thereby forming an opening 16 narrower than the pin 11. The hook 12 further includes an resilient slit 17 extending from the middle of the bases of the jaws 18 and 19 toward the base end of the hook 12. FIG. 1B is a cross sectional view showing the conformation of the pin 11 and hook 12 shown in FIG. 1A.

When assembling the pin 11 with the hook 12, the opening 16 is directed toward the pin 11 and the hook 12 is pressed against the pin 11. The pin 11 applies reaction forces onto the extruding ends of the front jaw 18 and the rear jaw 19, thereby pressing the front jaw 18 and the rear jaw 19 outwardly. Part of the hook 12 around the resilient slit 17 deforms outwardly, too, and the width of the opening 16 increases gradually. As the width of the opening 16 equals to the diameter of the pin 11 when the reaction forces coming from the pin 11 reaches a certain value (that is, the action force from the hook 12 to the pin 11 reaches a certain value), the pin 11 slips into the engaging groove 13 and is held by the front jaw 18 and the rear jaw 19.

Figure 2A:
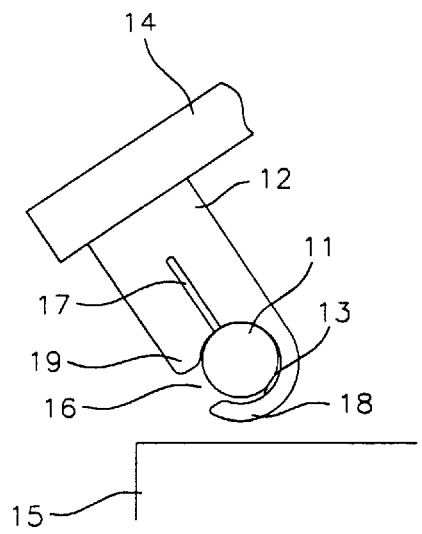
FIGS. 2A~2D are diagrams showing the position and deformation of he cover hinge structure of FIG. 1A.

The pin 11 stays within the engaging groove 13 during pivotal motion of the cover 14 because the width of the opening 16 is smaller then the diameter of the pin 11. In addition, the hook 12 is forced downward during rotating of the cover 14 because of the weight of the cover 14, and the contact region for the pin 11 and the hook 12 is restricted at the upper portion of the inner surface of the engaging groove 13, as seen in FIG. 2A. Accordingly, undesired detachment of the cover 14 from the body 15 is prevented.

Figure 2B:
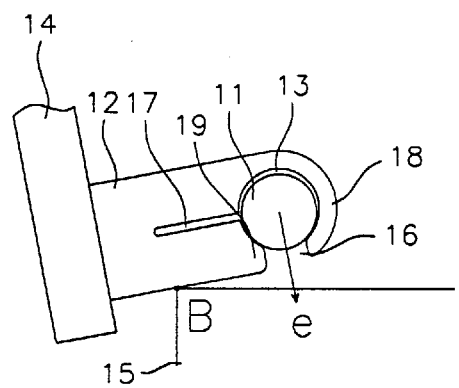

The hook 12 contacts a point B of the body 15 and rotates with taking point B as a rotating center when the cover 14 is lifted to the limit, as seen in FIG. 2B. The reaction forces applied from the pin 11 to the hook 12 point to direction e and act on the opening 16 of the engaging groove 13 (that is, on the extruding ends of both the front jaw 18 and rear jaw 19). Direction e of the reaction force is the same as the opening direction for the opening 16 of the engaging groove 13. Both the front jaw 18 and rear jaw 19 are pressed outwardly by the reaction force and the pin 11 tends to escape from the engaging groove 13 by way of the opening 16. However, resilient force of the hook 12 prevents the front jaw 18 and rear jaw 19 from being bent outwardly, thereby the hook 12 holds the pin 11 well and the cover 14 does not detach from the base 15.

Figure 2C:
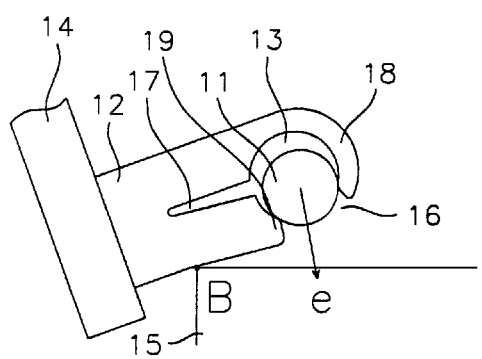
Figure 2D:
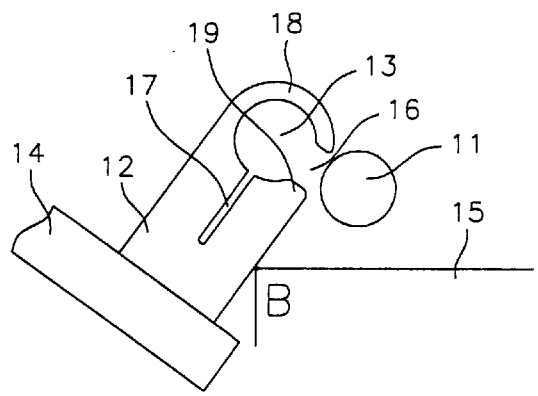

Referring now to FIG. 2C, the front jaw 18 and the rear jaw 19 deform apparently if the reaction forces coming from the pin 11 is increased when additional force other then the gravity force of the cover 14 is applied to the cover 14. The resilient slit 17 deforms and the width of the opening 16 increases gradually. As the width of the opening 16 equals to the diameter of the pin 11 when the reaction forces coming from the pin 11 reaches a certain value, the pin 11 slips out from the opening 16 of the engaging groove 13 and the hook 12 detaches from the pin 11, as seen in FIG. 2D.

The force required for detaching the hook 12 from the pin 11 can be determined by controlling the thickness of the front jaw 18, the thickness of the rear jaw 19, the length and width of the resilient slit 17, and the original width of the opening 16. Deformation of every part of the hook 12 is controlled not to exceed the elastic limit, thereby forming a cover hinge structure 10 having self-protection function.

The hinge structure 10 according to the invention is different from the hinge structure 80 shown in FIGS. 8A~8D in that the reaction force coming from the pin 11 acts on the opening 16 of engaging groove 13 when the cover 14 is lifted to the limit. For the hinge structure 80, the reaction force coming from the pin 81 is designed not to act on the opening 86 for preventing the hook 82 from detaching when the cover 84 is lifted to the limit. It is clear that the hinge structure 10 according to the invention has the function of self-protection, while the prior hinge structure 80 does not. In addition, the resilient slit 17 increases the resiliently deformable range of the hook 12, thus make the hook 12 more flexible. Besides, the hook 12 of the hinge structure 10 holds the pin 11 in the engaging groove 13 with resilient forces of the front jaw 18 and rear jaw 19, while the pin 81 is restricted by only one jaw of the hook 82.

Figure 3A:
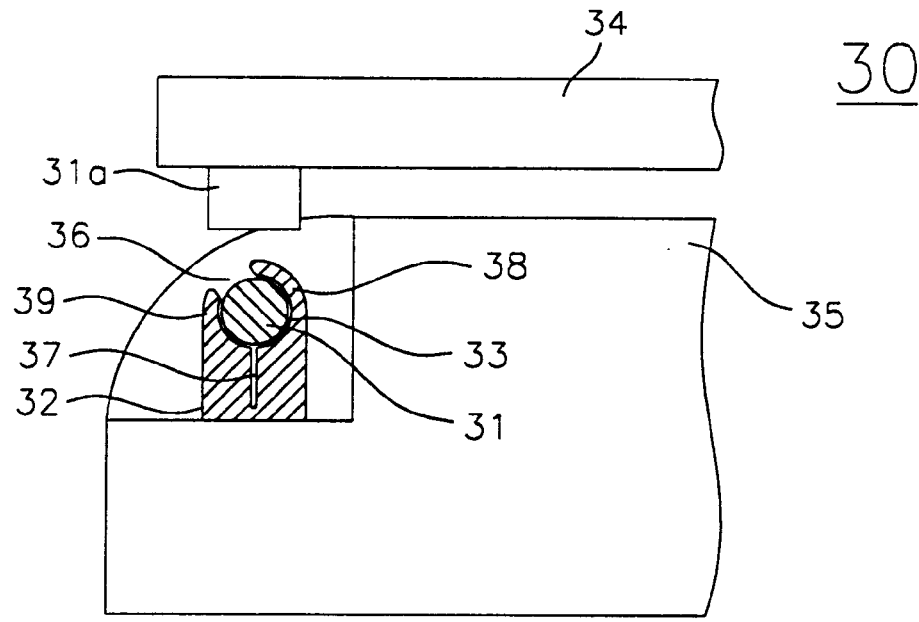
FIG. 3A is a schematic diagram showing a cover hinge structure according to the second embodiment of the invention.
Figure 3B:
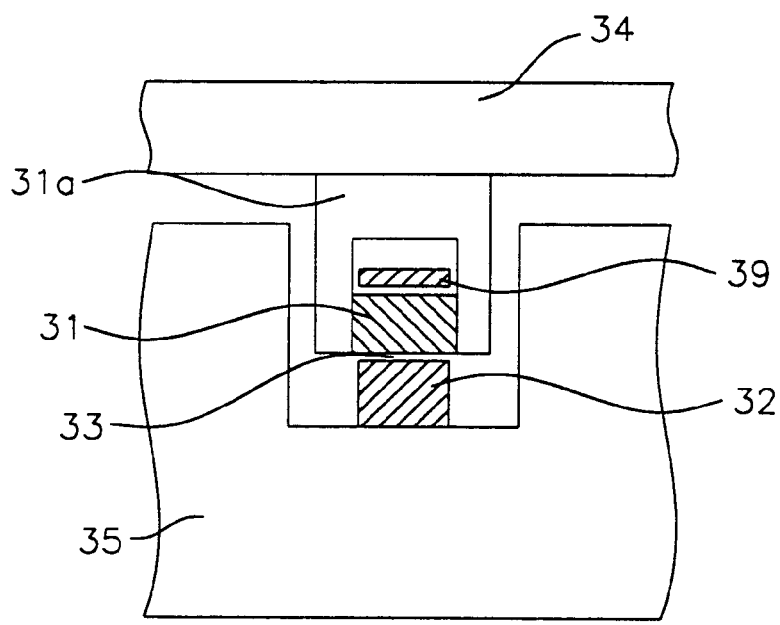
FIG. 3B is a cross sectional view of the second embodiment of the invention taken along the line II-II' shown in FIG. 3A.

Another hinge structure 30 according to a second embodiment of the invention is shown in FIGS. 3A and 3B. A hinge structure 30 consists of a pin 31, a pin frame 31a for supporting the pin 31, and a hook 32. Both ends of the pin 11 is fixed on one end of the pin frame 31a, while the other end of the pin frame 31a is integrated with a cover 34. The base end of the hook 32 connects to the body 35 and the engaging end of the hook 32 includes an extruding front jaw 38 and an extruding rear jaw 39. The opposed surfaces of both front jaw 38 and rear jaw 39 are curved to jointly form a substantially C-shaped engaging groove 33 having an internal diameter substantially the same as the diameter of the pin 31. Distance between the extruding ends of the front jaw 38 and the rear jaw 39 is smaller than the diameter of the pin 31, thereby forming an opening 36 narrower than the pin 31. The hook 32 further includes an resilient slit 37 extending from the middle of the bases of the jaws 38 and 39 toward the base end of the hook 32. FIG. 3B is a cross sectional view showing the conformation of the pin 31, pin frame 31a, and hook 32 shown in FIG. 3A.

Figure 4A:
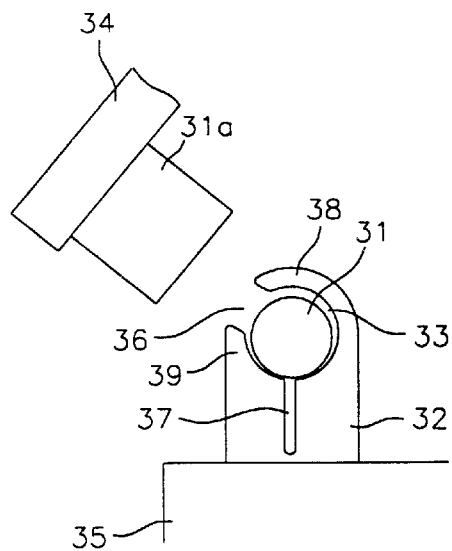
FIGS. 4A~4D are diagrams showing the position and deformation of the cover hinge structure of FIG. 3A.

The pin 31 stays within the engaging groove 33 during pivotal motion of the cover 34 because the width of the opening 36 is smaller then the diameter of the pin 31. In addition, the pin 31 is forced downward during rotating of the cover 34 because of the weight of the cover 34, and the contact region for the pin 31 and the hook 32 is restricted at the lower portion of the inner surface of the engaging groove 33 far away from the opening 36, as seen in FIG. 4A. Accordingly, undesired detachment of the cover 34 from the body 35 is prevented.

Figure 4B:
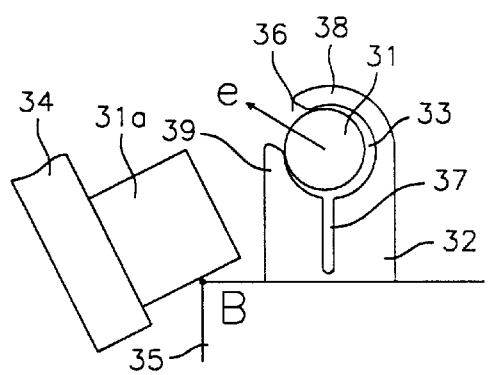

The pin frame 31a contacts a point B of the body 35 and rotates with taking point B as a rotating center when the cover 34 is lifted to the limit, as seen in FIG. 4B. The action forces applied from the pin 31 to the hook 32 point to direction e and act on the opening 36 of the engaging groove 33 (that is, the force act on the extruding ends of both the front jaw 38 and rear jaw 39). Direction e of the action force is the same as the opening direction for the opening 36 of the engaging groove 33. Both the front jaw 38 and rear jaw 39 are press outwardly by the action force and the pin 31 tends to escape from the engaging groove 33 by way of the opening 36. However, resilient force of the hook 32 prevents the front jaw 38 and rear jaw 39 from being bent outwardly, thereby the hook 32 holds the pin 31 well and the cover 34 does not detach from the base 35.

Figure 4C:
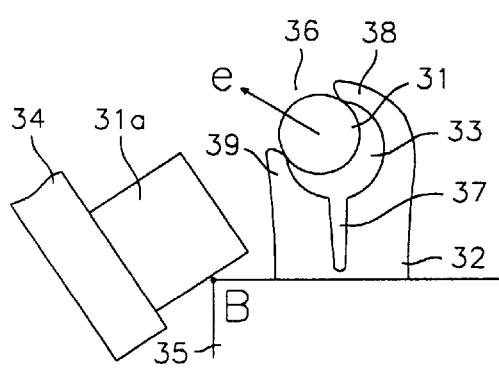
Figure 4D:
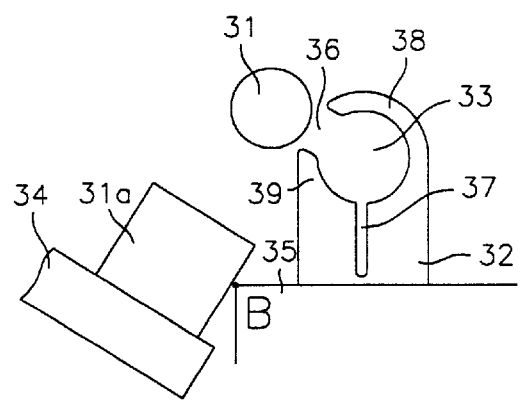
Figure 5:
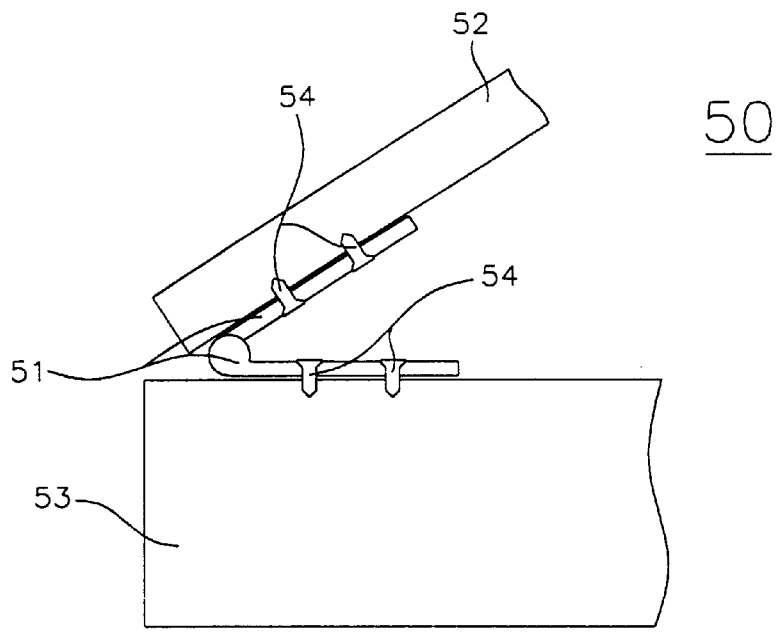
FIG. 5 is a diagram showing the construction of a prior hinge connecting a cover with a body.
Figure 6:
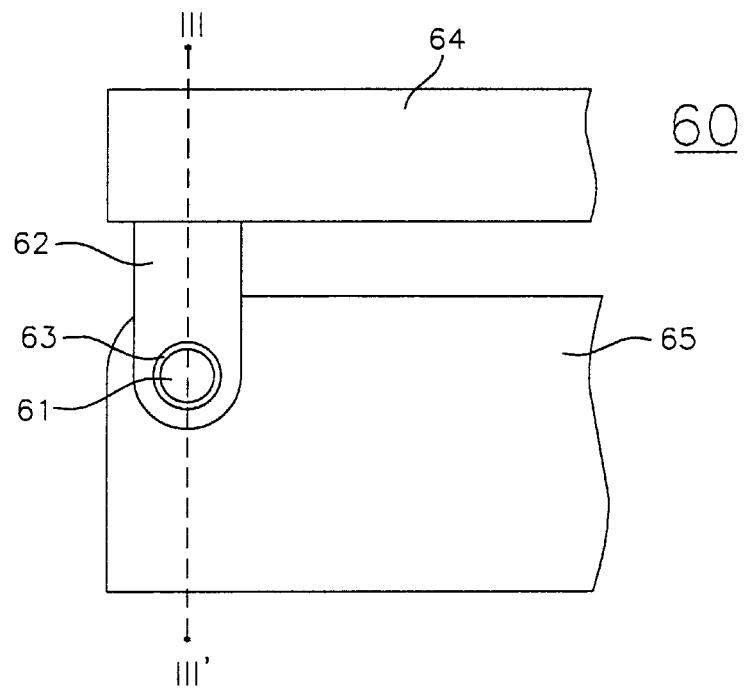
FIG. 6 is a diagram showing the construction of another prior hinge connecting a cover with a body.
Figure 7A:
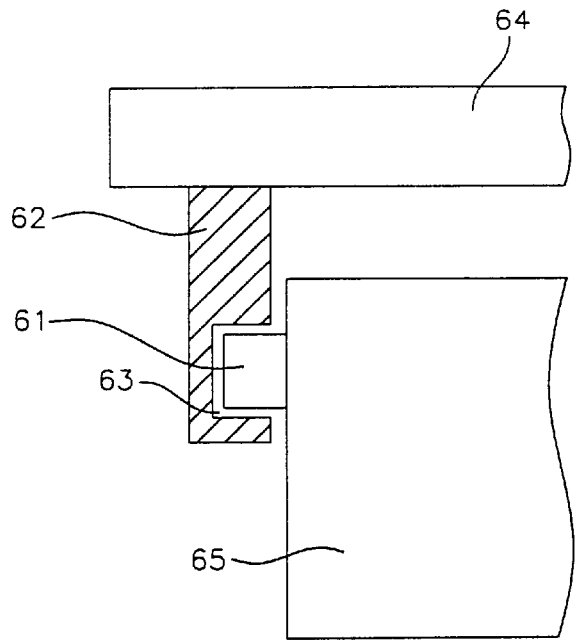
FIG. 7A is a cross sectional view taken along the line III-III' in FIG. 6 for showing one aspect of the prior hinge structure.
Figure 7B:
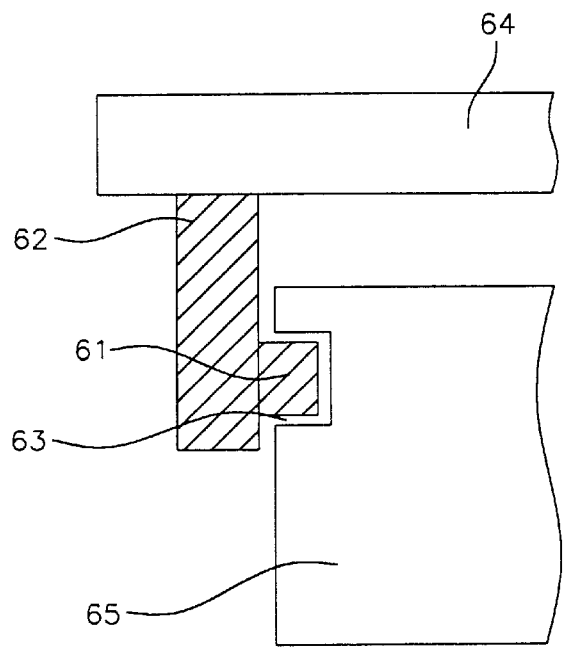
FIG. 7B is a cross sectional view taken along the line III-III' in FIG. 6 for showing another aspect of the prior hinge structure.
Figure 8A:
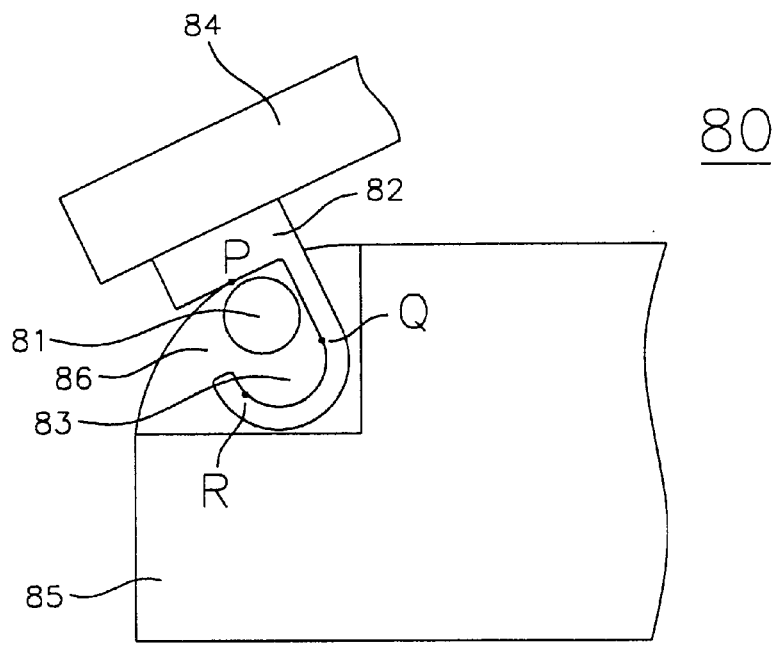
FIGS. 8A~8D are diagrams showing another prior hinge structure.
Figure 8B:
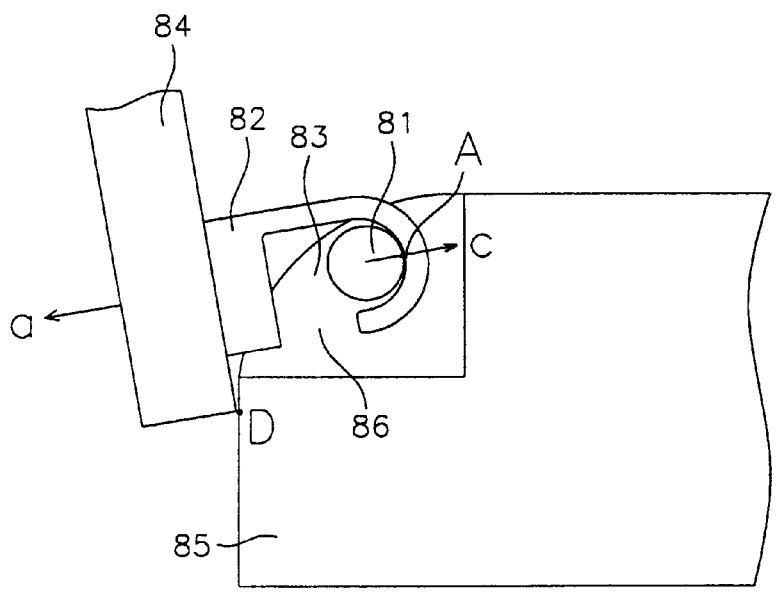
Figure 8C:
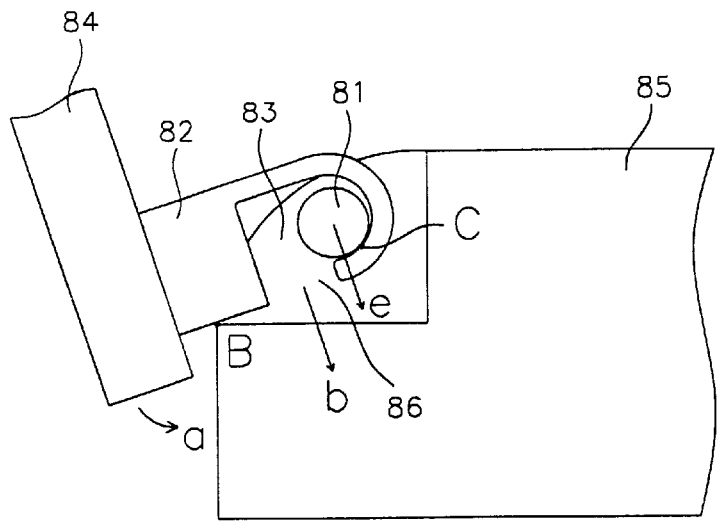
Figure 8D:
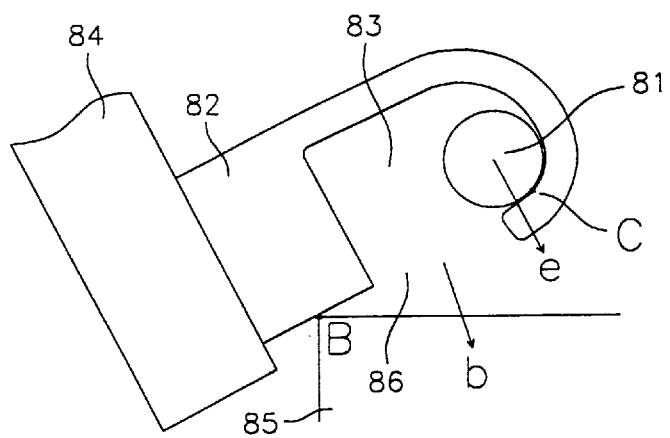
Figure 9A:
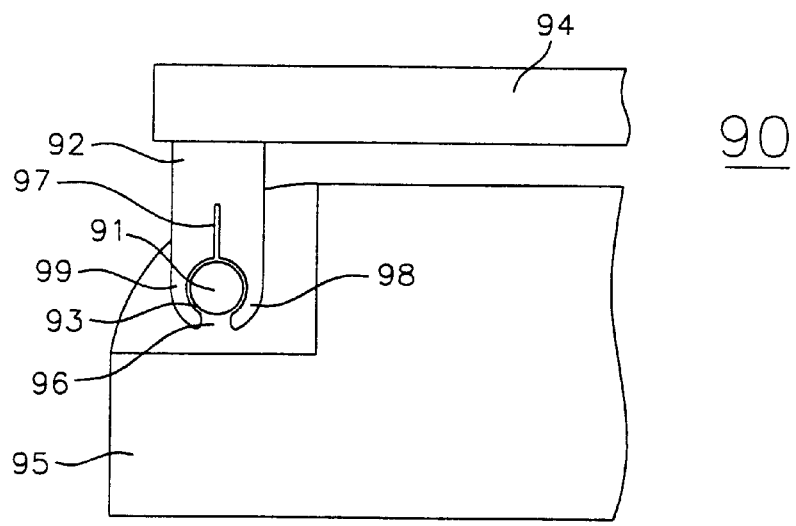
FIGS. 9A~9B are diagrams showing yet another prior hinge structure.
Figure 9B:
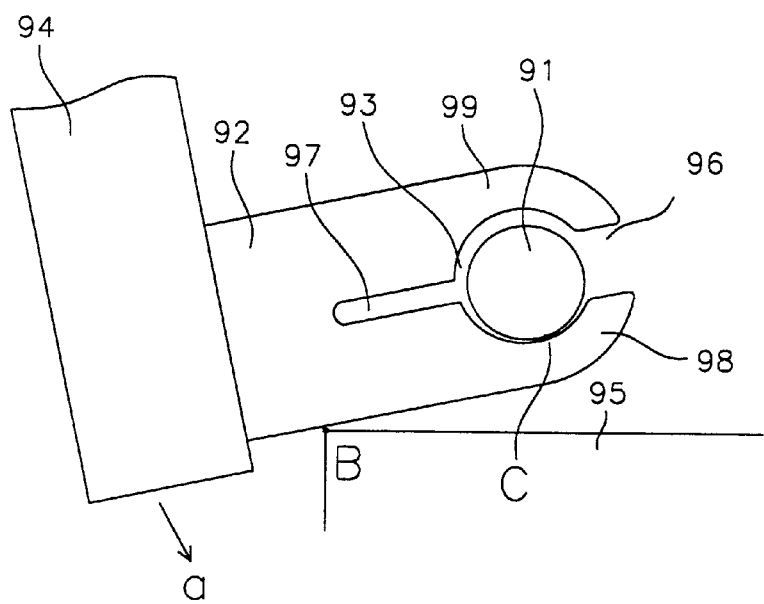

Referring now to FIG. 4C, the resilient slit 37, the front jaw 38 and the rear jaw 39 deform apparently if the action forces coming from the pin 31 increases when additional force other then the gravity force of the cover 34 is applied, and the width of the opening 36 increases gradually. As the width of the opening 36 equals to the diameter of the pin 31 when the action forces coming from the pin 31 reaches a certain value, the pin 31 slips out from the opening 36 of the engaging groove 33 of the hook 32, as seen in FIG. 4D.

Similarly, the force required for detaching the pin 31 from the hook 32 can be determined by controlling the thickness of the front jaw 38, the thickness of the rear jaw 39, the length and width of the resilient slit 37, and the original width of the opening 36. Deformation of every part of the hook 32 is controlled not to exceed the elastic limit, thereby forming a cover hinge structure 30 having self-protection function.

While the present invention has been described with reference to specific embodiments, the description is illustrative of the present invention and is not to be construed as limiting the present invention. Various modifications and applications may occur to those skilled in the art without departing from the true spirit and scope of the present invention as defined by the appended claims.

I claim:

1. A hinge structure for pivotably connecting a first member to a second member, comprising:

a cylindrical pin fixed on the first member; and a hook having an engaging end and a base end connected to the second member, said engaging end including an extruding front jaw and a rear jaw wherein the opposed surfaces of said front jaw and rear jaw are curved to jointly form a substantially C-shaped engaging groove having an internal diameter substantially the same as the diameter of said pin, with a opening of said substantially C-shaped engaging groove being smaller than the diameter of said pin, said pin being pivotably disposed within said engaging groove, characterized in that:

said hook and said pin being arranged so that when said second member is pivoted to the limit, said hook connected to said second member contacts said first member to thereby restrict pivotal motion of said hinge structure; and the force acted by said pin on said hook directs toward said opening of said engaging groove when pivotal motion of said hinge structure is restricted, said opening of said engaging groove is widened gradually as the action force increases, and said pin detaches from said engaging groove when width of said opening becomes the same as the diameter of said pin if the action force exceeds a predetermined limit, thereby preventing said hinge structure from damage.

2. A hinge structure as claimed in claim 1, wherein said hook further comprises a resilient slit extending from said engaging groove toward said base end of said hook for increasing resiliently deformable range of said hook.

* * * * *